United States Patent
Buis et al.

(10) Patent No.: US 6,631,007 B1
(45) Date of Patent: Oct. 7, 2003

(54) SYSTEM AND METHOD FOR PRESENTING MULTIPLE SHEETLETS ON A MEDIUM SURFACE WHILE PRESENTING MULTIPLE LOGICAL PAGES WITHIN THE SHEETLETS

(75) Inventors: Roger Lee Buis, Longmont, CO (US); Reinhard Heinrich Hohensee, Boulder, CO (US); David Earl Stone, Longmont, CO (US); Jamsie Rudy Treppendahl, Boulder, CO (US); Rose Ellen Visoski, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,604

(22) Filed: Dec. 14, 1999

(51) Int. Cl.[7] .............................................. G06F 13/00
(52) U.S. Cl. ...................... 358/1.13; 358/1.17; 358/1.15
(58) Field of Search ................................. 358/1.2, 1.12, 358/1.13, 1.14, 1.15, 1.18, 296, 449, 450, 451, 452; 399/75, 77, 79, 82

(56) References Cited

U.S. PATENT DOCUMENTS

| | | | |
|---|---|---|---|
| 4,928,252 A | 5/1990 | Gabbe et al. ................ 364/519 |
| 5,191,429 A | 3/1993 | Rourke ......................... 358/296 |
| 5,495,561 A | 2/1996 | Holt ............................. 395/114 |
| 5,768,488 A | 6/1998 | Stene et al. ................... 395/117 |
| 5,872,900 A | 2/1999 | Tsuchitoi ..................... 395/111 |
| 5,878,199 A | 3/1999 | Soker et al. .................. 395/117 |
| 6,337,961 B2 | * | 1/2002 | Mori et al. ..................... 399/82 |
| 6,417,931 B2 | * | 7/2002 | Mori et al. .................. 358/1.15 |
| 6,501,562 B1 | * | 12/2002 | Nakagiri et al. ............. 358/1.2 |

OTHER PUBLICATIONS

IBM Technical Disclosure Bulletin, vol. 38, No. 01, Jan. 1995, "Using PostScript Resources in Advanced Function Printing," pp. 287–288.

* cited by examiner

*Primary Examiner*—Mark Wallerson
(74) *Attorney, Agent, or Firm*—Scott W. Reid; Bracewell & Patterson, LLP

(57) ABSTRACT

A method and document presentation system utilize at least one N-up instruction together with at least one emulation instruction to cause multiple sheetlets to be presented on a surface of a physical sheet while multiple logical pages are presented within the multiple sheetlets. The at-least-one N-up instruction specifies that first and second logical pages are to be presented within a first sidemap and that a third logical page is to be presented within a second sidemap. The at-least-one emulation instruction specifies that said first sidemap is to be presented within a sheetlet on first area of a surface of a physical medium and that the second sidemap is to be presented within a second sheetlet on a second area of that surface.

24 Claims, 9 Drawing Sheets

PGP Structured Field — 610

| Repeating Group: 1 | Repeating Group: 2 | Repeating Group: 3 | Repeating Group: 4 |
|---|---|---|---|
| Offset = (X,Y)<br>Orientation = 0<br>Sheet Side = 1 Front | Offset = (X,Y)<br>Orientation = 0<br>Sheet Side = 1 Back<br>Flags = No Variable<br>PMC ID = x'04' | Offset = (X,Y)<br>Orientation = 90<br>Sheet Side = 1 Front | Offset = (X,Y)<br>Orientation = 90<br>Sheet Side = 1 Back |

*Fig. 6B*

PGP Structured Field

| Repeating Group: 1 | Repeating Group: 2 | Repeating Group: 3 | Repeating Group: 4 | Repeating Group: 5 | Repeating Group: 6 |
|---|---|---|---|---|---|
| Offset = (X,Y)<br>Orientation = 0<br>Sheet Side = 1 Front | Offset = (X,Y)<br>Orientation = 0<br>Sheet Side = 1 Back | Offset = (X,Y)<br>Orientation = 0<br>Sheet Side = 2 Front | Offset = (X,Y)<br>Orientation = 0<br>Sheet Side = 2 Back | Offset = (X,Y)<br>Orientation = 0<br>Sheet Side = 3 Front | Offset = (X,Y)<br>Orientation = 0<br>Sheet Side = 3 Back |

*Fig. 6C*

SYSTEM AND METHOD FOR PRESENTING MULTIPLE SHEETLETS ON A MEDIUM SURFACE WHILE PRESENTING MULTIPLE LOGICAL PAGES WITHIN THE SHEETLETS

BACKGROUND OF THE INVENTION

1. Technical Field

The present invention relates in general to document presentation systems and in particular to a system and method for presenting multiple logical pages of a document on a single physical medium sheet. Still more particularly, the present invention relates to a system and method for presenting multiple sheetlets on a surface of a physical medium while presenting multiple logical pages within the multiple sheetlets.

2. Description of the Related Art

Conventional presentation architectures represent documents in a presentation format that is independent of the methods utilized to capture or create those documents. According to such presentation architectures, documents may contain combinations of text, image, graphics, and/or bar code objects in conjunction with presentation instructions that specify a presentation format for those objects. Presentation architectures for presenting documents in printed format generally employ a presentation data stream comprising a device-independent application data stream and a device-dependent printer data stream. A data stream is a continuous, ordered stream of elements which conform to a given format.

Application Data Stream

Application programs can generate application data streams destined for an archive library, another application program, or a presentation service such as a printing system. International Business Machines Corporation of Armonk, N.Y. has developed an application data stream architecture that is distributed under the two trademarks Mixed Object Document Content Architecture and MO:DCA. MO:DCA provides data structures which applications may utilize to specify document layout for transmission to other applications and application services such as print services.

Within MO:DCA, document components are organized into a hierarchy within which document objects are composed of page objects and page objects contain data objects (such as bar code objects, graphics objects, image objects and presentation text objects). The document, page, and data objects are defined by data structures within the application data stream that contain the presentation data which comprise a document's content and the commands that specify the document's layout. Structured fields, the main MO:DCA data structures, may carry presentation data and may contain layout information specifying the placement and orientation of the presentation data within a page.

A structured field typically starts with an introducer that uniquely identifies the command, provides a total length for the command, and specifies additional control information such as whether padding bytes are present. The introducer is then followed by up to 32,759 data bytes. Data may be encoded within the structured field utilizing fixed parameters, repeating groups, key words, and triplets. Fixed parameters have a meaning only in the context of the structure that includes them. Repeating groups are utilized to specify grouping of parameters that can appear multiple times. Key words are self-identifying parameters that consist of a one byte unique key word identifier followed by a one byte keyword value. Triplets are self-identifying parameters that contain a one byte length field, a one byte unique triplet identifier, and up to 252 data bytes. Key words and triplets have the same semantics whenever they are utilized. Together these structures define a syntax for MO:DCA data streams which provide for orderly parsing and flexible extendibility.

MO:DCA provides commands for specifying object layout on a page level, as well as "N-up" commands, which allow applications to direct the presentation system to present multiple (i.e., "N") logical pages on one or both surfaces of a physical sheet and to customize the orientation and placement of each of those logical pages. N-up functionality was developed by International Business Machines Corporation and is described in U.S. Pat. No. 5,768,488, which is incorporated herein by reference. As explained in that patent, when a presentation system receives logical pages associated with N-up commands, the presentation system arranges each "N" of those logical pages (or, for duplex printing, two times "N" of those logical pages) into what is known as a logical sheet. For example, if printing simplex (i.e., on only a single side of each sheet of paper) in a 2-up format, the presentation system arranges two logical pages on each logical sheet before transferring that logical sheet to a physical sheet of paper. N-up commands, therefore, allow users to specify page position and orientation on a logical-sheet level.

Documents which are defined in the MO:DCA format are called presentation documents, and presentation documents may be archived in a database and later retrieved, viewed, annotated, and/or printed in local or distributed system environments. A data stream containing a presentation document is device independent. That is, the data stream should produce the same document content in the same format on different presentation devices, such as printers or display devices (dependent, however, on the capabilities of each presentation device).

Printer Data Stream

A printer data stream within a presentation architecture is a device-dependent, continuous, ordered stream of data elements and objects conforming to a given format, which are destined for a presentation device. The printer data stream architecture distributed under the two trademarks Intelligent Printer Data Stream and IPDS defines a data stream that is utilized by print system managers (such as print server programs and print device drivers) to manage all-points-addressable page printing on a full spectrum of devices from low-end workstations and local area network-attached printers to high-speed, high-volume page printers for production jobs (Print On Demand environments), shared printing, and mailroom applications. That architecture was developed by International Business Machines Corporation and is disclosed within U.S. Pat. No. 4,651,278, which is incorporated herein by reference. Commonly, IPDS data streams are derived from MO:DCA data streams, and the presentation content of the IPDS data stream is then interpreted and presented by microcode executing in printer hardware.

The same content carried in a MO:DCA data stream can be carried in an IPDS data stream. As in MO:DCA, the main data structure in the IPDS architecture is called a structured field. The IPDS structured fields describe presentation layouts and provide for dynamic management of resources, such as overlays, page segments, and loaded fonts. For example, the IPDS architecture provides structured fields that correspond to the MO:DCA structured fields for "N-up" placement of multiple logical pages within a single physical sheet.

Additional important features of the IPDS architecture are bi-directional command and acknowledgement protocols at the data stream level for query, resource management, and error recovery, as well as interfaces for document finishing operations provided by pre-processing and post-processing devices (such as continuous-forms sheet splitters and collators) attached to IPDS printers. The acknowledgement protocol enables the exchange of query-reply information, page synchronization of the print system manager and print controller processes, and the return to the print system manager of detailed exception information.

In addition to commands for N-up printing, IPDS provides a command that invokes cut-sheet emulation (CSE). The CSE command is used to direct a printer containing continuous forms media of a particular size (e.g., 17 by 11 inches) to emulate a printer containing media half that size (e.g., 8.5 by 11 inches). Continuous forms printers that print simplex and duplex (i.e., on only one side and on both sides of a sheet of paper, respectively) are available, and CSE may be used in simplex mode to print two pages per sheet and in duplex mode to print 4 pages per sheet (two on the front surface and two on the back). When in CSE mode, the printer interacts with the print system manager as if each physical sheet was two physical sheets, thereby allowing twice as many pages to be printed simultaneously. In effect, the printer automatically issues internal N-up commands (as opposed to receiving explicit N-up commands from the application data stream) which cause the logical pages to be mapped to left and right sheetlets, which are printed simultaneously. The continuous forms paper is then directed into a post-processor, which slits each sheet of paper into two sheets and collates the resulting sheets to produce a cut-sheet document.

However, in conventional printing systems, N-up commands are controlled by the user, but CSE commands are not, in keeping with the device-independent nature of the application data stream. That is, a user application does not (and cannot) request CSE. Instead, the print system manager automatically requests CSE in response to determinations that the printer is configured to provide CSE (i.e., that a printer with CSE capabilities has been set by an operator to accept the CSE command) and that the logical pages in the application data stream will fit side-by-side on a physical sheet. The print system manager ascertains that the printer is configured for CSE and ascertains the dimensions of the physical sheet from the printer, via the bi-directional command and acknowledgement protocols mentioned above.

A further difference between CSE and N-up is that CSE does not allow either the position or the orientation of the logical pages on the presentation medium to be customized. For instance, if two-sheetlet CSE is invoked for output with 8.5 by 11 inch logical pages on a printer with 17 by 11 inch paper, the printer will position each logical page either entirely within the left half or entirely within the right half of the physical sheet. By contrast, N-up allows the origin of a page to be set at any position within the usable area of a physical sheet.

Print-On-Demand (POD) Environment

Production-level POD environments are typical of the environments within which CSE commands are useful. A typical POD environment requires the support of high-speed (400 pages per minute) and high-resolution (600 pels per inch) printers at or near rated speed. An advantage derived from utilizing a continuous-forms printer operating in CSE mode, rather than a cut-sheet printer, is that continuous-forms printers typically produce output faster than cut-sheet printers.

A disadvantage associated with conventional printing systems, however, is that CSE and N-up cannot be utilized together in those systems. A user may specify N-up commands, or a printer in CSE mode may specify what are, in effect, internal N-up commands, but if user-specified N-up commands are received while the printer is in CSE mode, CSE mode is automatically terminated. As should thus be apparent, it would be desirable to provide a system and method for presenting documents that allows N-up commands and multi-page emulation modes, such as CSE, to be utilized together. The present invention provides a system and method that provides such functionality.

SUMMARY OF THE INVENTION

A system and method are disclosed that utilize at least one N-up instruction together with at least one emulation instruction to cause multiple sheetlets to be presented on a surface of a physical sheet while multiple logical pages are presented within the multiple sheetlets. The at-least-one N-up instruction specifies that first and second logical pages are to be presented within a first sidemap and that a third logical page is to be presented within a second sidemap. The at-least-one emulation instruction specifies that said first sidemap is to be presented within a sheetlet on first area of a surface of a physical medium and that the second sidemap is to be presented within a second sheetlet on a second area of that surface.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A–6C depict illustrative MO:DCA presentation objects that utilize N-up to define the presentation layouts of FIGS. 4 and 5;

FIG. 7 depicts a portion of an MO:DCA data stream utilizing the medium map presentation objects of FIG. 6A to represent a bank statement and some associated items;

DETAILED DESCRIPTION OF ILLUSTRATIVE EMBODIMENT

The following terminology will be used herein to describe an illustrative embodiment of the present invention.

Definitions

Physical sheet: a tangible medium, such as paper, with at least one surface that is suitable for presenting information. For example, cut-sheet printers print on physical sheets of paper, and some continuous-forms printers print on paper that is obtained from a roll and cut into physical sheets. In printing systems with rolls of media, the term physical sheet refers to that portion of a medium which will become a distinct sheet of output upon completion of post-processing procedures.

Logical page: zero or more items of presentation content which a user application has flagged as belonging together on a page. For example, a user application might flag items as belonging together on a page by building an application data stream in which those items reside between consecutive begin-page and end-page presentation instructions. Alternatively, an application might generate an empty page by issuing a page-eject instruction.

Sidemap: in a document using N-up formatting, the "N" logical pages which will be printed together on one side of a physical sheet. For example, in duplex, 2-up printing, the front and back of a physical sheet will each receive a sidemap with two pages.

Logical sheet: one or more logical pages which, according to an application data stream, should be presented on a single physical sheet. For example, in duplex, 2-up printing, a logical sheet includes a front sidemap and a back sidemap, with each sidemap containing two pages.

Sheetlet: (1) a fractional portion (usually half) of a physical sheet, onto which a printer transfers a logical sheet, thereby allowing the printer to print multiple logical sheets on a single physical sheet; (2) the presentation data that will be printed on such a fractional portion of a physical sheet. In simplex printing sheetlets have one side, and in duplex printing they have two.

Sheet image: a data structure, such as a bitmap, encoding the presentation data to be printed on one surface of a medium. For example, in simplex, N-up, CSE printing, a sheet image includes two sidemaps, one in a left sheetlet and one in a right sheetlet. Two sheet images (and two print engines) may be utilized simultaneously for duplex printing.

System Overview

Figure 1:
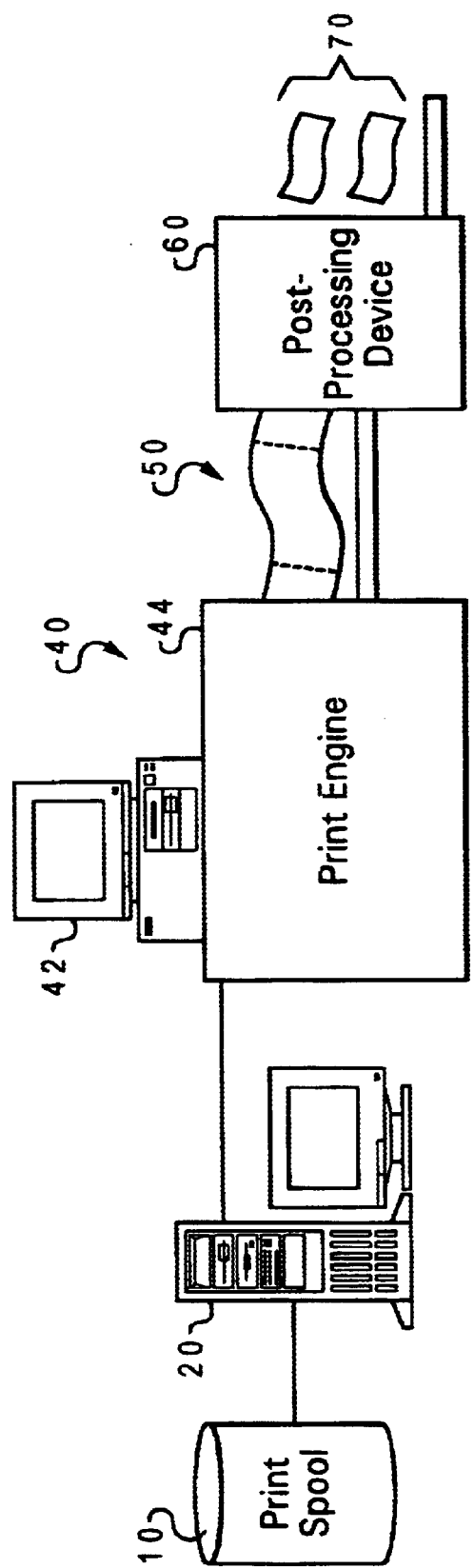
FIG. 1 depicts the major hardware components of an illustrative presentation system with facilities, according to the present invention, for printing multiple sheetlets on a surface of a physical medium while printing multiple logical pages within the multiple sheetlets.

With reference now to the figures, and in particular with reference to FIG. 1, there is depicted print system hardware including an archive file or print spool 10 for storing MO:DCA data streams. Those data streams are retrieved from print spool 10 by a presentation system manager, such as print system manager 20, which transforms MO:DCA data, resource and control objects into corresponding IPDS objects and sends the resultant IPDS data stream to a print controller 42 of a printer 40. Print controller 42, in turn, sends presentation-ready (e.g., bit mapped) sheet images to at least one print engine 44 in printer 40. Print engine 44 transfers those images onto continuous forms paper 50, which is fed into a post-processing device 60 that cuts paper 50 into cut sheets 70 and collates cut sheets 70 to produce a printed document.

Figure 2:
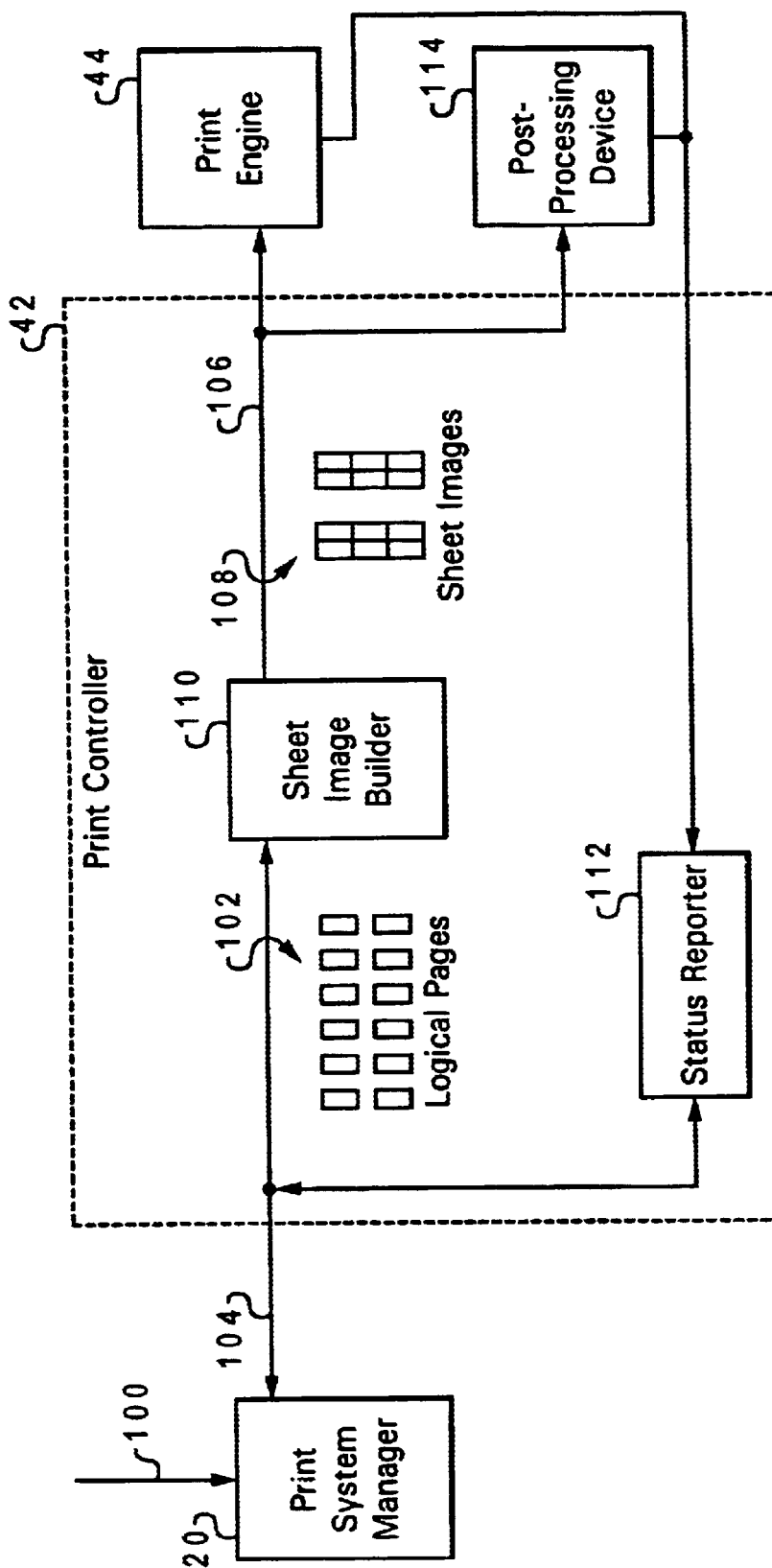
FIG. 2 illustrates a block diagram of a system model of the presentation system of FIG. 1.

Referring now to FIG. 2, there is illustrated a system model of the print system of FIG. 1. As shown, print system manager 20 receives an MO:DCA data stream 100 as input and translates the MO:DCA data stream into a corresponding IPDS data stream 104. The MO:DCA data stream contains a number of logical pages 102, defined by a plurality of data objects and associated presentation instructions, and, after translation, those same logical pages 102 are transmitted to print controller 42 within IPDS data stream 104.

As described in greater detail below, print controller 42 analyzes IPDS data stream 104 and, utilizing a sheet image builder 110, creates sheet images 108 based on the presentation data and layout instructions in IPDS data stream 104. Sheet images 108 are then transmitted (e.g., as a bit map stream 106) to at least one print engine 44, which prints the sheet image onto paper to produce a physical sheet. For example, when printing duplex, an image for the front side of a sheet might be sent to a first print engine and second image for the back side might be sent to a second print engine of printer.

Print controller 42 also includes a status reporter 112, which monitors the status of print engine 44 and provides print system manager 20 with query-reply and exception information, in accordance with the IPDS bi-directional command and acknowledgement protocols. In addition, print controller 42 directs document finishing operations by sending control signals to, and receiving status information from, a post-processing device 114.

Translating Data Streams

Figure 3:
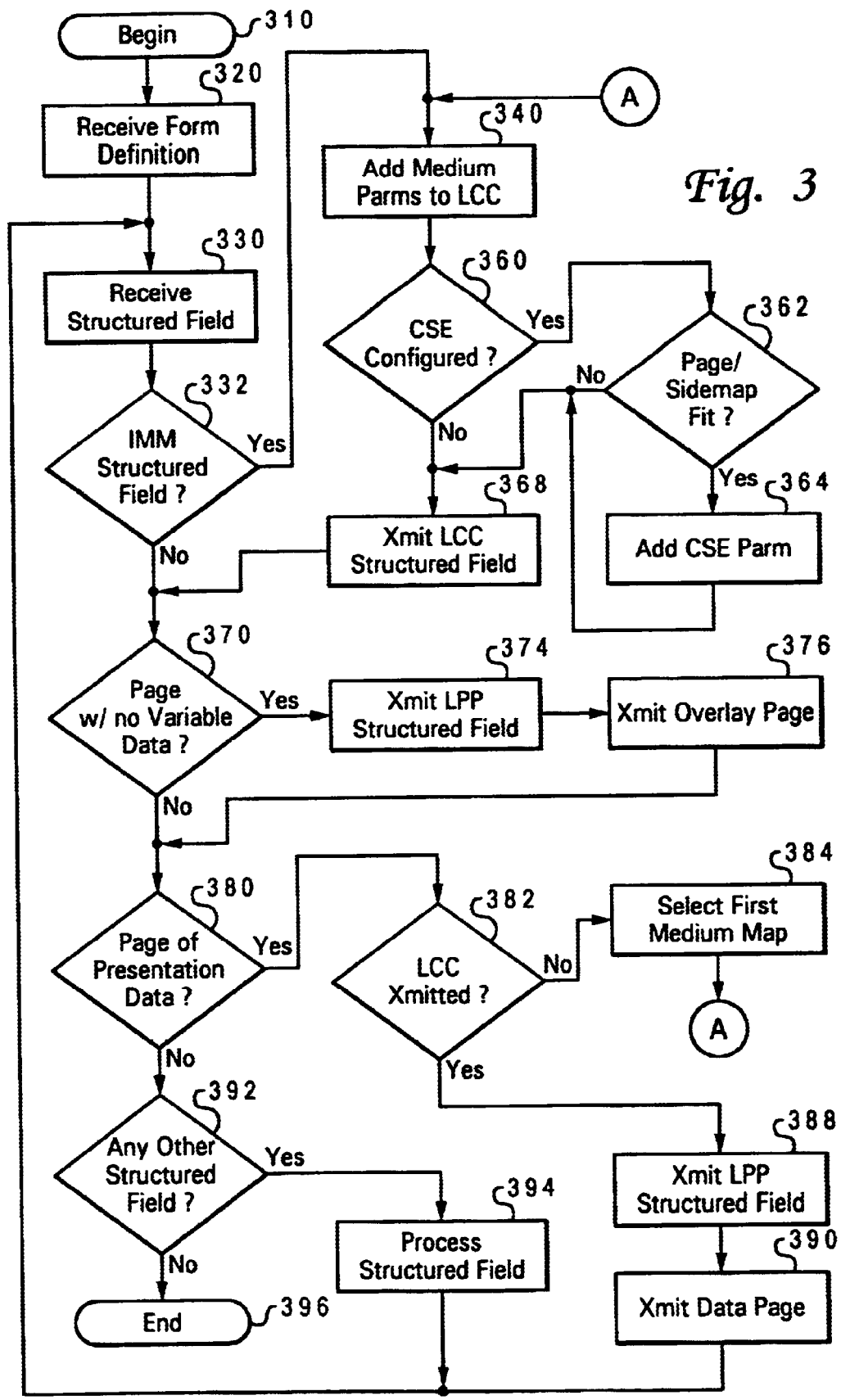
FIG. 3 depicts a logical flowchart of an illustrative process, according to the present invention, for converting an application data stream into a printer data stream that causes multiple sheetlets to be printed on a surface of a physical medium while multiple logical pages are printed within the multiple sheetlets.
Figure 4:
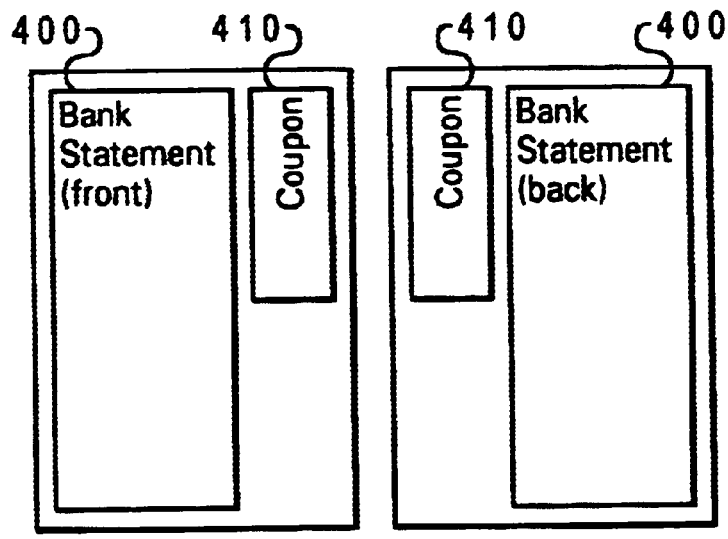
FIGS. 4 and 5 illustrate two exemplary presentation layouts combining multiple logical pages on a single physical sheet.
Figure 5:
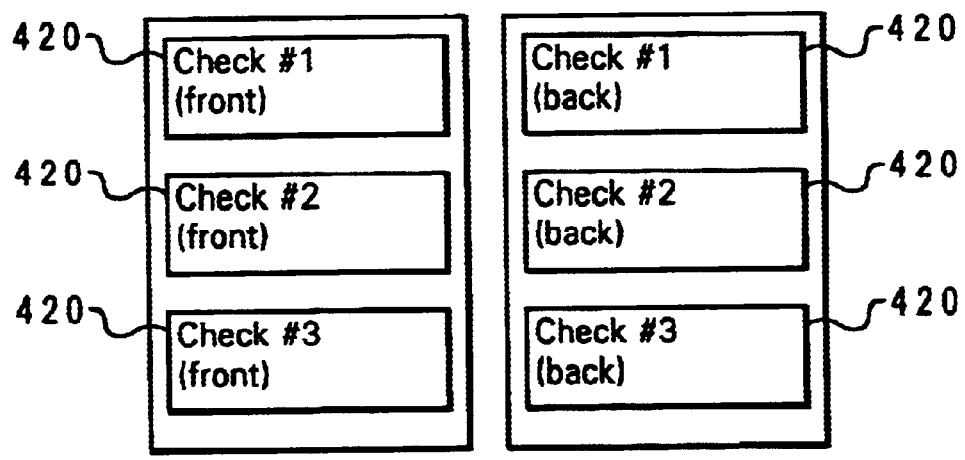

With reference now to FIG. 3, there is depicted a logical flowchart describing an illustrative process for translating an application data stream into a printer data stream that causes a printer to present multiple sheetlets on a surface of a physical medium while presenting multiple logical pages within the multiple sheetlets. Portions of that process will be described within the context of a print job designed to produce a two-sided bank statement 400 and a two-sided coupon 410, as illustrated in FIG. 4, as well as zero or more two-sided images of checks 420, as shown in FIG. 5. Bank statement 400 and coupon 410 are to be printed together on a single sheet of 8.5 by 11 inch paper, using a portrait orientation (i.e., printing parallel to a short side of the paper) for bank statement 400 and a landscape orientation (i.e., printing parallel to a long side of the paper) for coupon 410. Checks 420 are to be printed separately from statement 400, using a portrait orientation, with up to three checks 420 on each sheet of 8.5 by 11 inch paper.

The process depicted in FIG. 3 begins at block 310 with print system manager 20 having selected a print job (such as the print job described above) from print spool 10. The print job will include presentation data and layout instructions (such as new-page instructions) that were generated by an application program, as well as the name of a form definition that specifies additional layout instructions (such as page orientation instructions). Run-time execution parameters, such as job control language (JCL) commands, will have been used to associate the form definition with the presentation data.

Figures 6A, 7:
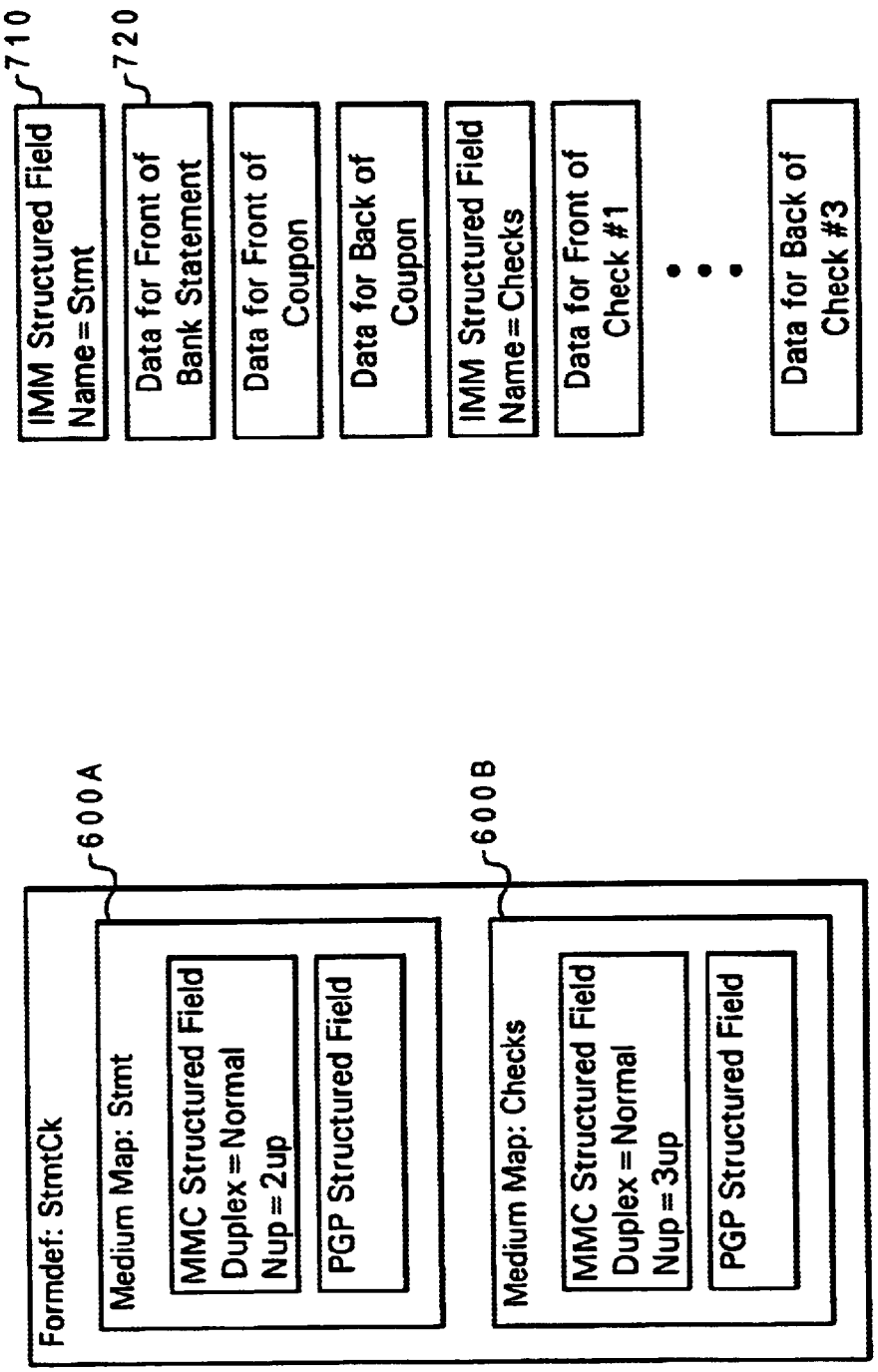

After the print job has been selected, the process passes to block 320, which illustrates print system manager 20 retrieving the named form-definition object from a library of resource objects. In the illustrative embodiment, the form definition associated with the selected print job is named "StmtCk", and, as illustrated in FIG. 6A, that form definition includes one medium map 600A named "Stmt" and a second medium map 600B named "Checks". Those medium maps are MO:DCA print control resource objects that contain print control parameters for presenting pages on a physical medium. Those print control parameters include one medium modification control (MMC) structured field for each of medium maps 600A and 600B. Both of those MMC structured fields specify that output is to be printed duplex ("duplex=normal"); however, the MMC structured field for medium map 600A specifies that up to two logical pages should be printed on each side if a physical sheet ("Nup=2up"), while the one for medium map 600B specifies that up to three logical pages should be printed on each side of a physical sheet ("Nup=3up").

Medium maps 600A and 600B each also contain a page position (PGP) structured field which specifies layout parameters to be used when printing the presentation data from the selected print job. As depicted in FIGS. 6B and 6C, respectively, the PGP structured field for medium map 600A includes four repeating groups, and the PGP structured field for medium map 600B includes six repeating groups. In accordance with conventional N-up presentation technology, those repeating groups specify offsets, orientations, and sheet sides to be used to print consecutive logical pages. For example, repeating group "2" 610 provides the paired values "1 Back" as a "Sheet Side" parameter. Repeating group "2" thereby specifies that the next logical page should be offset from the origin of partition number "1" (of the two partitions resulting from the "Nup=2up" parameter of the MMC structured field) and should be placed on the "Back" of the physical sheet.

In contrast to all of the other illustrated repeating groups, repeating group "2" 610 for medium map 600A also specifies the parameters "Flags=No Variable" and "PMC ID=x'04'", as shown in FIG. 6B. Those parameters instruct print system manager 20 that, immediately after any page for repeating group "1" of medium map 600A is printed, a page with no variable data (i.e., no data from the application program) but with the overlay resource object identified by the code x'04' should be printed. In the illustrative embodiment, overlay x'04' (not illustrated) includes boilerplate language for the back of the bank statement.

Referring again to FIG. 3, once the form definition object has been retrieved, the process enters an input loop, beginning at block 330, for processing the structured fields containing the presentation data and layout instructions that were generated by the application program. As shown at block 330, within the input loop print system manager 20 first extracts the first (or current) structured field from the MO:DCA data stream. Then, as shown at block 332, print system manager 20 determines whether that structured field contains an invoke medium map (IMM) command. If so, print system manager 20 begins building an IPDS load copy control (LCC) structured field with initial medium parameters that correspond to the parameters of the media map named in the IMM structured field, as shown at block 340. For instance, referring to FIG. 7 (which illustrates a portion of a MO:DCA data stream that utilizes medium maps 600A and 600B to present logical pages according to the layouts depicted in FIGS. 4 and 5), when the first IMM structured field 710 is the current field (i.e., the structured field currently being processed by print system manager 20), print system manager 20 will build an LCC structured field having the simplex/duplex and N-up characteristics that are specified in the MMC structured field of medium map 600A.

After print system manager 20 has set the initial medium parameters of the LCC structured field, the process then passes to block 360, which illustrates a determination of whether printer 40 is configured for CSE. If so, print system manager 20 determines whether two logical pages (or, if the media map specified N-up printing, two sidemaps) will fit within the printable area of the physical medium, as shown at block 362. That determination is made, for example, by comparing the page size specified by a page description (PGD) structured field with the printable area of the physical medium. The determinations depicted at blocks 360 and 362 are based on information from printer 40 indicating the size and/or printable area of the physical medium in printer 40 and indicating whether printer 40 is configured for CSE. Printer 40 sends that information to print system manager 20 in reply to a sense, type, model (STM) query. Print system manager 20 transmits an STM command to the printer upon presentation system initialization or reconfiguration.

If it is determined at block 362 that two logical pages (or sidemaps) will fit within the printable area, print system manager 20 adds an additional parameter value to the LCC structured field to activate CSE, as shown at block 364. For example, FIG. 9, which illustrates a portion of an IPDS data stream generated in response to the MO:DCA data stream of FIG. 7, depicts the command for activating CSE as a "CSE=x'C302'" parameter within the LCC structured field 910. Print system manager 20 then transmits the LCC structured field to printer 40, as illustrated at block 368. However, if the printer is not configured for CSE, or if two pages (or sidemaps) will not fit within the printable area, print system manager 20 does not add the CSE parameter to the LCC structured field before transmitting that structured field to printer 40, as depicted at block 368. After the LCC structured field is transmitted, the process passes to block 370.

The process also passes to block 370 if the determination depicted at block 332 indicates that the current structured field from the application program is not an IMM structured field. As shown at block 370, print system manager 20 then determines whether a page with an overlay but no variable data should now be printed, for example by determining whether a page counter corresponds to a repeating group with "Flags=No Variable" parameter. If so, print system manager 20 retrieves the appropriate overlay from a library of resource objects and builds a logical page including that overlay. The process then passes to block 374, which shows print system manager 20 transmitting an LPP structured field to printer 40 with page position and orientation parameters derived from the repeating group (within the PGP structured field) that corresponds to the current page count. After the LPP structured field is transmitted, the process proceeds to block 376, which illustrates print system manager 20 transmitting the logical page with the overlay to printer 40.

For instance, after print system manager 20 has sent the first page of data 720 to printer 40, the page count will correspond to repeating group "2" 610, which is depicted in FIG. 6B. Consequently, as described in blocks 370–376, in the next iteration of the input loop print system manager 20 will transmit an LPP structured field to the printer, followed by a logical page with the overlay "x'04'", such as the fields in FIG. 9 with the reference numbers 920 and 930, respectively. When printing logical page 930, printer 40 will therefore utilize the offset, placement, and orientation instructions from LPP structured field 920 (with possible adjustments for CSE, for example), as described below.

After the page with no variable data is transmitted, or if it is determined that such a page should not be transmitted, the process passes to block 380, which depicts print system manager 20 determining whether the current structured field marks the beginning of a logical page of presentation data. If so, print system manager 20 determines whether it has transmitted an LCC command yet, as illustrated at block 382. If an LCC command has been transmitted, print system manager 20 transmits an LPP structured field, as depicted at block 388. As shown at block 390, print system manager 20 then receives the remainder of the page object from the MO:DCA data stream and transmits the current logical page to printer 40 within an IPDS data stream. After the logical page has been sent, the process then resumes the input loop, starting at block 330.

However, if it is determined at block 382 that no LCC structured field has been transmitted yet, print system manager 20 utilizes a default medium map by selecting the first medium map from the form definition that was received at block 320, as illustrated at block 384, and then building and transmitting a corresponding LCC structured field, as depicted at blocks 340–368 and described above (the process having passed from block 384 to block 340 through connector A).

With reference again to block 380, if it is determined that the current structured field does not mark the beginning of a page object, the process passes to block 392, which depicts print system manager 20 determining whether the MO:DCA data stream contains a structured field other than the structured fields for IMM and logical pages of presentation data. If so, that field is processed, as shown at block 394 and the process then returns to block 330 to resume the input loop. If the current print job contains no more structured fields, however, the process of translating those structured fields ends, as depicted at block 396. Print system manager 20 may then select a new print job from print spool 10 and begin translating that new print job by reentering the illustrated process at block 310.

Producing Output

Figure 8A:
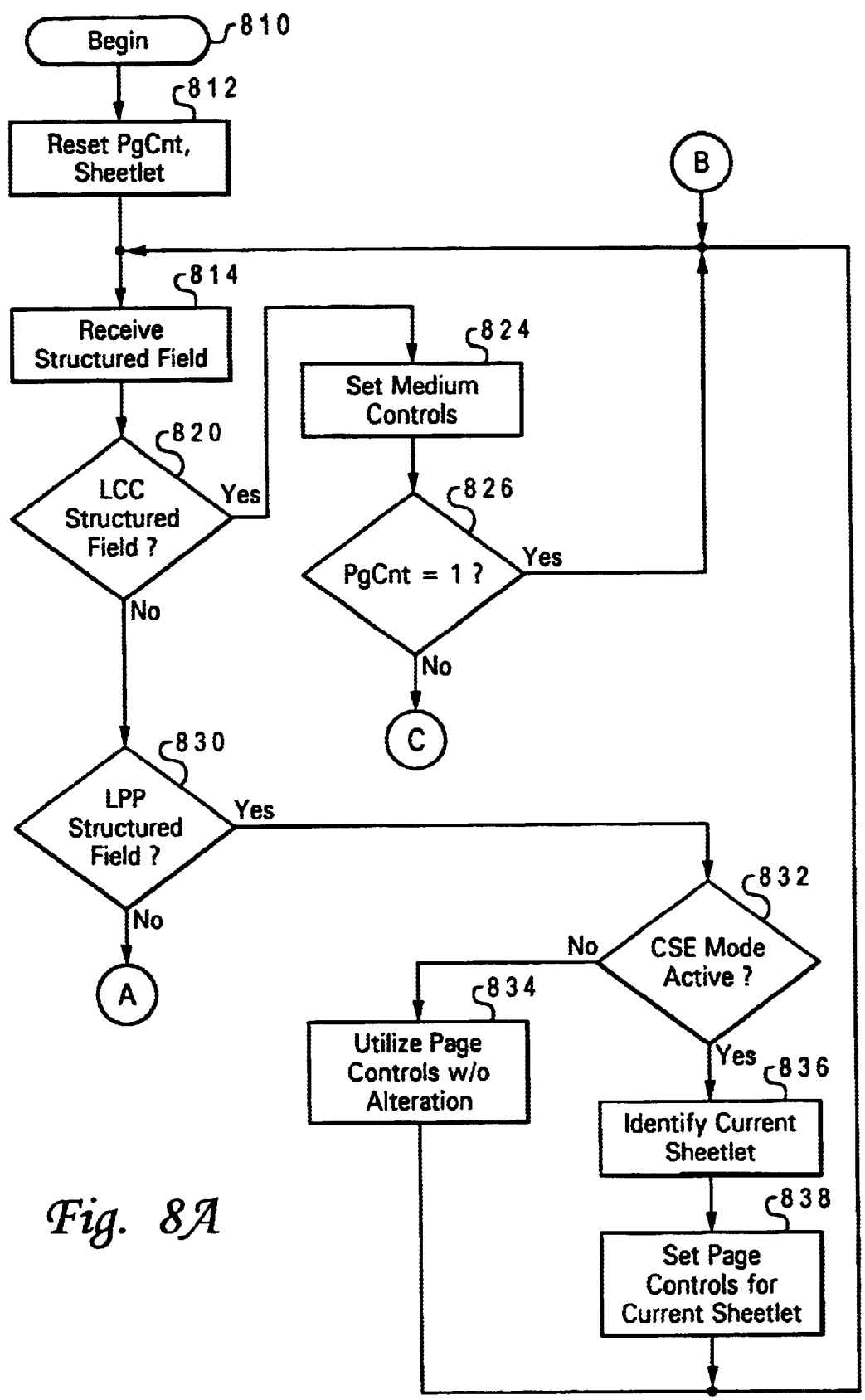
FIGS. 8A and 8B illustrate a logical flowchart of an illustrative process, according to the present invention, for presenting multiple sheetlets on a surface of a physical medium while presenting multiple logical pages within the multiple sheetlets in response to receipt of a printer data stream such as that produced by the process illustrated in FIG. 3.
Figure 8B:
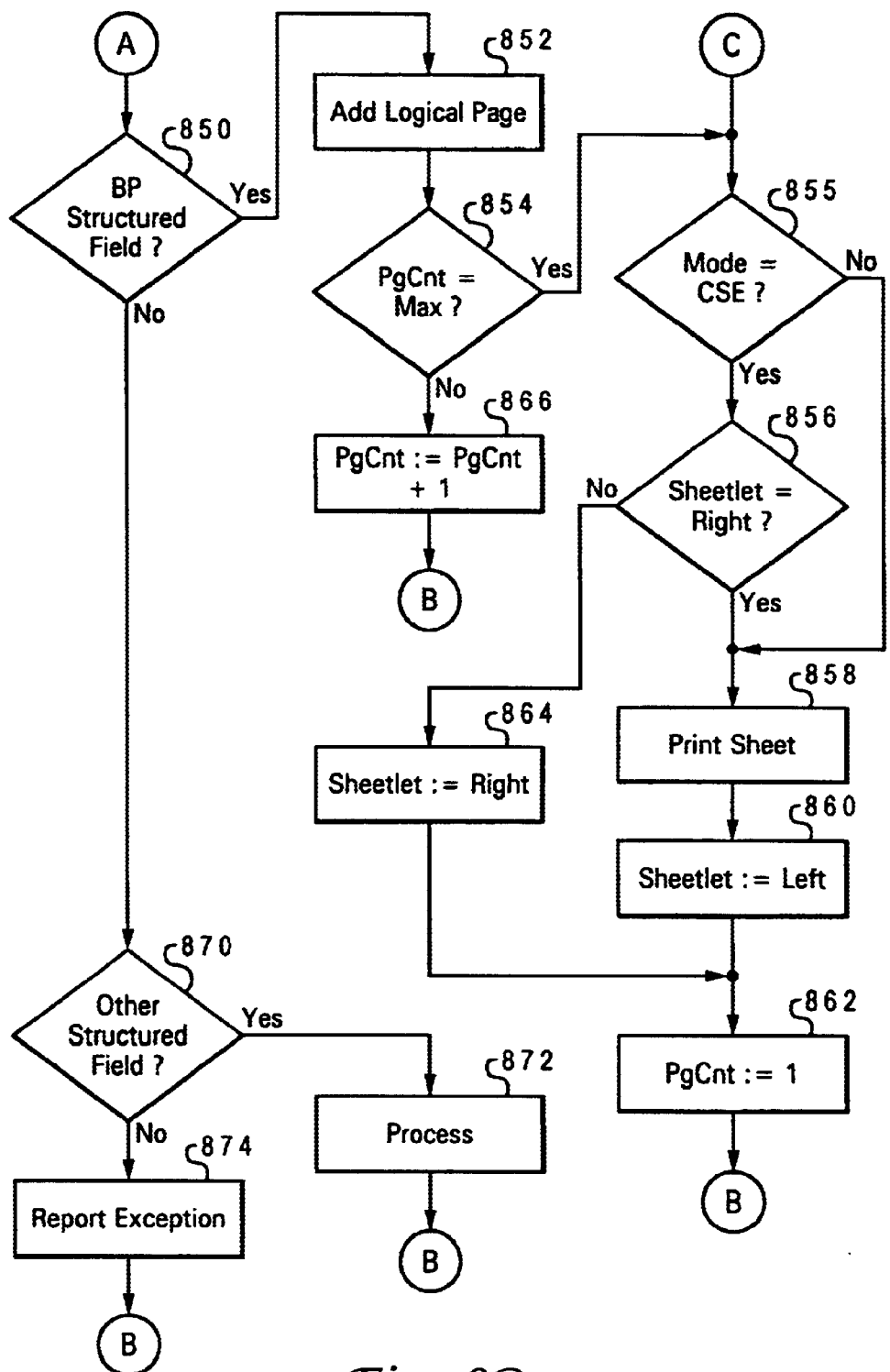

Referring now to FIGS. 8A and 8B, there is depicted a logical flowchart of an illustrative process for printing multiple sheetlets on a surface of a physical medium while printing multiple logical pages within the multiple sheetlets, based on an IPDS data stream such as that generated by the process illustrated in FIG. 3. The process of producing output begins at block 810 and proceeds to block 812, which depicts print controller 42 initializing a PgCnt variable to 1 and a Sheetlet variable to Left. Next, print controller 42 enters an input loop, starting with block 814, which shows print controller 42 receiving a structured field from an IPDS data stream.

The process then passes to block 820, which shows print controller 42 determining whether the current structured field is an LCC structured field. If so, print controller 42 sets internal medium controls, such as simplex/duplex, N-up, and CSE, according to the layout instructions in the LCC structured field, as depicted at block 824. Then, as illustrated at block 826, print controller 42 determines whether PgCnt equals 1 (i.e., whether no logical pages have been received for the current sheetlet), in which case the process returns to block 814 to resume the input loop.

However, if it is determined that the current sheetlet already includes one or more images, the process passes through page connector C to block 855. Print controller 42 then resets PgCnt to 1 and resumes the input loop after either changing the current sheetlet from Left to Right or printing the physical sheet with the current sheetlet, as described below with regard to the processing that is performed when logical pages are received.

With reference again to block 820, if the current structured field is not an LCC structured field, the process passes to block 830, which illustrates print controller 42 determining whether the current structured field is an LPP structured field. If so, print controller 42 then determines whether CSE mode is active, as illustrated at block 832. If CSE mode is not active, print controller 42 utilizes the layout instructions in the received LPP structured field, without alteration, to set internal page controls (such as page position and orientation) as illustrated at block 834.

However, if CSE mode is active, print controller 42 bases the internal page controls on the layout parameters from the LPP structured field, but only after altering the values of those parameters so that the logical pages will have the proper appearance after each physical sheet has been slit into two. Print controller accomplishes this task by determining which sheetlet is the current sheetlet, as depicted at block 836, and then modifying the layout parameters as needed to position and orient the pages within the current sheetlet, as depicted at block 838.

Figure 9:
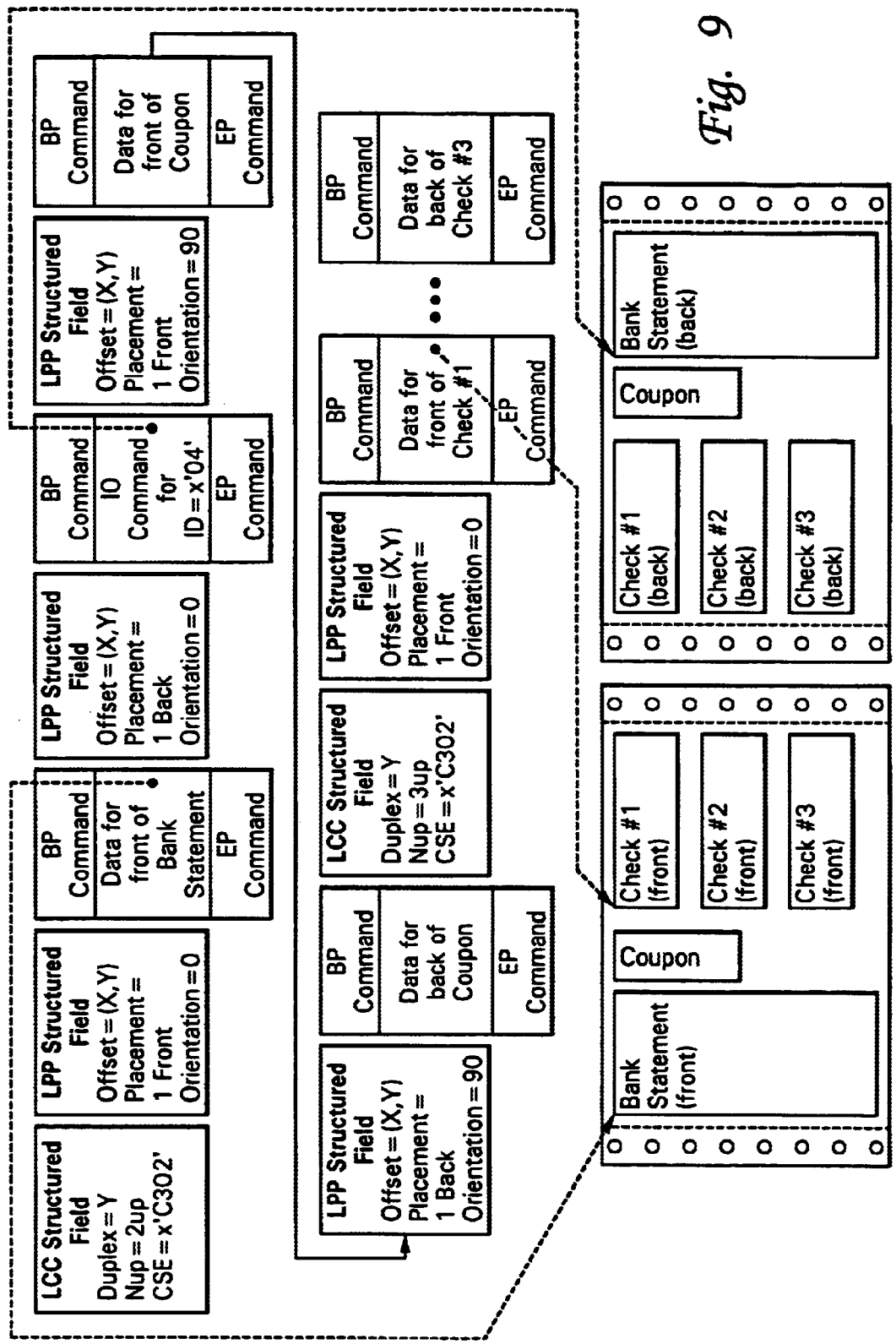
FIG. 9 depicts a portion of an IPDS data stream utilizing CSE and N-up together, in accordance with the present invention, and a resulting page layout on a physical sheet.

For example, if print controller 42 is printing on 17 by 11 inch paper and processing the structured fields illustrated in FIG. 9 (which invoke CSE), when the first LPP structured field 940 is received, print controller 42 will automatically alter the orientation value of 0 degrees (which would cause the next logical page to be printed parallel with the short side of the sheet) by 90 degrees so that the next logical page will instead be oriented parallel with the long (i.e., 17 inch) side of the sheet. The orientations from other LPP structured fields received while in CSE mode will likewise be altered by 90 degrees, in recognition of the fact that when the sheet is slit, the long side will typically become the short side. Offset values are also typically altered to, in effect, position the next logical page relative to the upper-left corner of the current sheetlet, rather than the upper left corner of the entire sheet. For instance, if the right sheetlet is the current sheetlet and print controller 42 is processing the fifth LPP structure field 950 from FIG. 9, the offset value will be modified to place the origin of the logical page to be printed next at the upper left corner of the second sheetlet. Consequently, after the sheets are slit, the orientation and position of the logical pages on the slit sheets will correspond to the layout instructions from the LPP structured fields, as suggested by the dashed lines in FIG. 9 leading from various logical pages 930, 960, and 962 to resulting pages on the front surface 970A and back surface 970B of a physical sheet of output. Once the internal page controls have been set, the process returns to block 814 to resume the input loop.

Referring again to block 830, if it is determined that the current field is not an LPP structured field, the process passes through page connector A to block 850, which depicts print controller 42 determining whether the current structured field is a begin page (BP) structured field. If so, the process passes to block 852, which illustrates print controller 42 accepting the presentation data and end page (EP) structured field for the current page object from the IPDS data stream and adding that page to a sheet image, in accordance with the current page controls (such as position and orientation). Then, as shown at block 854, it is determined whether the current page corresponds to the last page of a logical sheet. That is, print controller 42 compares the value of PgCnt with the value of a variable (Max) that indicates how many logical pages fit on a logical sheet, according to the current simplex/duplex and N-up settings. For example, when the print mode is duplex and 1-up, Max equals two. If it is determined that the current logical sheet is full, the process proceeds to block 855, which illustrates a determination of whether CSE is active. If so, print controller 42 then determines whether print controller 42 was building a right sheetlet, as shown at block 856. If the current sheetlet is a right sheetlet, or if it was determined at block 855 that CSE is not active, print controller 42 then transmits the current sheet image or images to print engine 44, as depicted at block 858, to produce a corresponding physical sheet of output. Then, print controller 42 resets Sheetlet to Left and PgCnt to 1, as depicted at blocks 860 and 862, respectively, and the process returns (through page connector B) to block 814 to resume the input loop.

However, if it is determined at block 855 that CSE is active and at block 856 that the current sheetlet is not the right sheetlet, print controller 42 does not print a sheet but sets Sheetlet to Right and PgCnt to 1, as depicted at block 864 and 862, respectively. The process returns through page connector B to block 814 to resume the input loop. Referring again to block 854, if it is determined that PgCnt does not equal Max, print controller 42 simply increments PgCnt, as depicted at block 866, and the process returns to block 814 via page connector B.

With reference again to block 850, if it is determined that the current structured field is not a BP structured field, the process proceeds to block 870, which illustrates a determination of whether the current structured field matches any other valid structured field. If so, that structured field is processed, as shown at block 872. For instance, if print controller 42 receives a structured field indicating that the current print job is complete, a physical sheet will be printed including all of the logical pages that have been added to the sheet image or images since the previous physical sheet was printed. If the current structured field is not valid, however, an exception is reported to print system manager 20, as shown at block 874. The process then passes either from block 872 or block 874 through page connector B to block 814 to resume the input loop.

Conclusion

Thus, as has been described, the present invention provides cut-sheet emulation that enables multiple sheetlets to be printed on a single physical sheet while multiple logical pages are printed (according to layout instructions such as N-up) within each sheetlet. Furthermore, the present invention provides a variety of CSE commands that, in addition to simply activating and deactivating CSE, allow print system manager 20 to affect other printing characteristics. For example, the present invention provides the CSE parameter values described (with corresponding effects) below:

x'C300'=Activate CSE; eject to the next sheetlet; and de-activate CSE for logical sheets that utilize N-up.

x'C301'=Activate CSE; eject to the next physical sheet; and de-activate CSE for logical sheets that utilize N-up.

x'C302'=Activate CSE; eject to the next sheetlet; and retain CSE activation for logical sheets that utilize N-up.

x'C303'=Activate CSE; eject to the next physical sheet; and retain CSE activation for logical sheets that utilize N-up.

While the invention has been particularly shown and described with reference to an illustrative embodiment, it will be understood by those skilled in the art that various changes in form and detail may be made therein without departing from the spirit and scope of the invention. For example, although the illustrative embodiment describes a process that applies CSE and N-up formatting to a document that utilizes, as a baseline, default orientation and print direction formatting, it should be understood that CSE and N-up can be utilized for data streams that include MO:DCA commands for customizing a document's baseline orientation and print direction, as well. It should also be recognized that, though the illustrative embodiment describes a CSE mode that provides two sheetlets per physical sheet and utilizes the left sheetlet first, the present invention could as well be utilized with CSE modes that provide three or more sheetlets per physical sheet, that utilize the right sheetlet first, and that place the top of a logical sheet at the bottom of a physical sheet.

Also, while the illustrative embodiment has been described with reference to presentation data and layout instructions generated by an application program, it should be apparent that the presentation data need not originally have been created in the MO:DCA format, but could be converted to the MO:DCA format from other page-description languages, such as the one distributed by Adobe Systems Inc. under the trademark PostScript. Furthermore, although the illustrative embodiment involved a presentation system utilizing the MO:DCA and IPDS data streams developed by International Business Machines Corporation, those skilled in the art will recognize that the teachings of the present invention may readily be incorporated into other presentation data stream architectures. In addition, although presentation data is transferred to paper according to the illustrative embodiment, it should be recognized that the present invention could as well be used in presentation systems that produce output on other media, such as microfilm.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A data processing system with facilities for instructing a presentation device to present multiple sheetlets on a surface of a physical sheet while presenting multiple logical pages within said multiple sheetlets, said data processing system comprising:

an input facility that receives presentation content and presentation instructions specifying that said presentation content is to be presented as at least first, second, and third logical pages;

a presentation manager that generates at least one N-up instruction specifying that said first and second logical pages are to be presented within a first sidemap and that said third logical page is to be presented within a second sidemap, and that generates at least one emulation instruction specifying that said first sidemap is to be presented within a first sheetlet on a surface of a physical medium and that said second sidemap is to be presented within a second sheetlet on said surface; and an output facility that transmits said at least one N-up instruction, said at least one emulation instruction, and said presentation content to a presentation device, such that said presentation device presents said first sheetlet on a first area of said surface and said second sheetlet on a second area of said surface in accordance with said at least one emulation instruction, and presents said first and second logical pages within said first sheetlet and said third logical page within said second sheetlet in accordance with said at least one N-up instruction.

2. A data processing system according to claim 1, wherein:

said presentation manager is a print system manager that includes said input facility and said output facility;

said input facility extracts said presentation content from an application data stream; and said output facility transmits said presentation content to said presentation device within a printer data stream.

3. A data processing system according to claim 1, wherein said presentation manager generates said at least one emulation instruction based on an indication from said presentation device that said presentation device is configured to present said first and second sheetlets on said surface.

4. A data processing system according to claim 1, wherein said presentation manager generates said at least one N-up instruction in response to receipt of at least one corresponding N-up instruction within said presentation instructions.

5. A data processing system according to claim 1, wherein:

said presentation manager comprises:
an interface that obtains printable dimensions of said surface from said presentation device; and
means for determining first dimensions of said first sidemap and second dimensions of said second sidemap; and said presentation manager generates said at least one emulation instruction in response to a determination that said first dimensions and said second dimensions fit within said printable dimensions.

6. A data processing system according to claim 5, wherein said at least one emulation instruction comprises an instruction for said presentation device to enter a cut-sheet emulation mode.

7. A presentation device with facilities for presenting multiple sheetlets on a surface of a physical sheet while presenting multiple logical pages within said multiple sheetlets, said presentation device comprising:

an interface that receives at least one N-up instruction, at least one emulation instruction, presentation content, and presentation instructions specifying that said presentation content is to be presented as at least first, second, and third logical pages; and a presentation controller that responds to receipt of said at least one N-up instruction, said at least one emulation instruction, said presentation content, and said presentation instructions by:
presenting a first sheetlet on a first area of a surface of a physical medium and a second sheetlet on a second area of said surface in accordance with said at least one emulation instruction; and presenting a first sidemap including said first and second logical pages within said first sheetlet and a second sidemap including said third logical page within said second sheetlet in accordance with said at least one N-up instruction.

8. A presentation device according to claim 7, wherein said presentation controller is a print controller which includes said interface, which extracts said presentation content from a printer data stream, and which utilizes a print engine to present said first and second sheetlets on said surface.

9. A presentation device according to claim 7, wherein said presentation device utilizes said interface to transmit, to a presentation manager, an indication that said presentation device is ready to accept data for presentation and an indication that said presentation device is configured to present said first and second sheetlets on said surface.

10. A presentation device according to claim 7, wherein said presentation device utilizes said interface to transmit, to a presentation manager, printable dimensions of said surface, such that said presentation manager can determine whether said first and second sidemaps will both fit within said printable dimensions.

11. A method in a presentation system for generating presentation instructions that combine N-up functionality and alternate-medium emulation, said method comprising:

receiving presentation content and presentation instructions specifying that said presentation content is to be presented as at least first, second, and third logical pages;

in response to receipt of said presentation content and said presentation instructions, generating at least one N-up instruction specifying that said first and second logical pages are to be presented within a first sidemap and that said third logical page is to be presented within a second sidemap;

generating at least one emulation instruction specifying that said first sidemap is to be presented within a first sheetlet on a surface of a physical medium and that said second sidemap is to be presented within a second sheetlet on said surface;

transmitting said at least one N-up instruction, said at least one emulation instruction, and said presentation content to said presentation device, such that said presentation device presents said first sheetlet on a first area of said surface and said second sheetlet on a second area of said surface in accordance with said at least one emulation instruction, and presents said first and second logical pages within said first sheetlet and said third logical page within said second sheetlet in accordance with said at least one N-up instruction.

12. A method according to claim 11, wherein:

said step of receiving said presentation content and said presentation instructions comprises receiving an application data stream that includes said presentation content and said presentation instructions; and said step of transmitting said at least one N-up instruction, said at least one emulation instruction, and said output data comprises transmitting a printer data stream that includes said at least one N-up instruction, said at least one emulation instruction, and said presentation content.

13. A method according to claim 12, further comprising:

in response to receipt of said at least one N-up instruction, said at least one emulation instruction, and said presentation content at said presentation device, presenting said first sheetlet on a first area of said surface and said second sheetlet on a second area of said surface in accordance with said at least one emulation instruction, and presenting said first and second logical pages within said first sheetlet and said third logical page within said second sheetlet in accordance with said at least one N-up instruction.

14. A method according to claim 13, further comprising executing a user application that produces said application data stream.

15. A method according to claim 11, wherein said step of generating said at least one emulation instruction is performed based on an indication from said presentation device that said presentation device is configured to present said first and second sheetlets on said surface.

16. A method according to claim 11, wherein said step of generating said at least one N-up instruction is performed in response to receipt of at least one corresponding N-up instruction within said presentation instructions.

17. A method according to claim 11, further comprising:
obtaining printable dimensions of said surface from said presentation device; and
determining first dimensions of said first sidemap and second dimensions of said second sidemap; and wherein:
said step of generating said at least one emulation instruction is performed in response to a determination that said first dimensions and said second dimensions fit within said printable dimensions.

18. A method according to claim 17, wherein said step of generating at least one emulation instruction comprises generating an instruction for said presentation device to enter a cut-sheet emulation mode.

19. An article of manufacture for use in instructing a presentation device to present multiple sheetlets on a surface of a physical sheet while presenting multiple logical pages within said multiple sheetlets, the article of manufacture comprising computer readable storage media including program logic embedded therein that causes control circuitry to perform the steps of:
receiving presentation content and presentation instructions specifying that said presentation content is to be presented as at least first, second, and third logical pages;
in response to receipt of said presentation content and said presentation instructions, generating at least one N-up instruction specifying that said first and second logical pages are to be presented within a first sidemap and that said third logical page is to be presented within a second sidemap;
generating at least one emulation instruction specifying that said first sidemap is to be presented within a first sheetlet on a surface of a physical medium and that said second sidemap is to be presented within a second sheetlet on said surface;
transmitting said at least one N-up instruction, said at least one emulation instruction, and said presentation content to said presentation device, such that said presentation device presents said first sheetlet on a first area of said surface and said second sheetlet on a second area of said surface in accordance with said at least one emulation instruction, and presents said first and second logical pages within said first sheetlet and said third logical page within said second sheetlet in accordance with said at least one N-up instruction.

20. An article of manufacture according to claim 19, wherein:
said program logic that causes said control circuitry to receive said presentation content and said presentation instructions comprises program logic that causes said control circuitry to receive an application data stream that includes said presentation content and said presentation instructions; and
said program logic that causes said control circuitry to transmit said at least one N-up instruction, said at least one emulation instruction, and said output data comprises program logic that causes said control circuitry to transmit a printer data stream that includes said at least one N-up instruction, said at least one emulation instruction, and said presentation content.

21. An article of manufacture according to claim 19, wherein:
said program logic that causes said control circuitry to generate said at least one emulation instruction comprises program logic that causes said control circuitry to generate said at least one emulation instruction based on an indication from said presentation device that said presentation device is configured to present said first and second sheetlets on said surface.

22. An article of manufacture according to claim 19, wherein:
said program logic that causes said control circuitry to generate said at least one N-up instruction comprises program logic that causes said control circuitry to generate said at least one N-up instruction in response to receipt of at least one corresponding N-up instruction within said presentation instructions.

23. An article of manufacture according to claim 19, wherein:
said program logic further comprises:
program logic that causes said control circuitry to perform the step of obtaining printable dimensions of said surface from said presentation device; and
program logic that causes said control circuitry to perform the step of determining first dimensions of said first sidemap and second dimensions of said second sidemap; and
said program logic that causes said control circuitry to generate said at least one emulation instruction comprises program logic that causes said control circuitry to generate said at least one emulation instruction in response to a determination that said first dimensions and said second dimensions fit within said printable dimensions.

24. An article of manufacture according to claim 23, wherein:
said program logic that causes said control circuitry to generate said at least one emulation instruction comprises program logic that causes said control circuitry to generate an instruction for said presentation device to enter a cut-sheet emulation mode.

* * * * *